(12) United States Patent
Mori (10) Patent No.: US 10,908,692 B2
(45) Date of Patent: Feb. 2, 2021

(54) TOUCHPAD MODULE

(71) Applicant: NIDEC COPAL CORPORATION, Tokyo (JP)

(72) Inventor: Takashi Mori, Tokyo (JP)

(73) Assignee: NIDEC COPAL CORPORATION, Tokyo (JP)

(*) Notice: Subject to any disclaimer, the term of this patent is extended or adjusted under 35 U.S.C. 154(b) by 0 days.

(21) Appl. No.: 16/663,322

(22) Filed: Oct. 24, 2019

(65) Prior Publication Data

US 2020/0133397 A1    Apr. 30, 2020

(30) Foreign Application Priority Data

Oct. 25, 2018   (JP) ................. 2018-200772

(51) Int. Cl.
  *G06F 3/0354*   (2013.01)
  *G06F 3/01*     (2006.01)
  *H02K 33/18*    (2006.01)
(52) U.S. Cl.
  CPC .......... *G06F 3/016* (2013.01); *G06F 3/03547* (2013.01); *H02K 33/18* (2013.01)

(58) Field of Classification Search
  CPC ...... G06F 3/016; G06F 3/03547; H02K 33/18
  See application file for complete search history.

(56) References Cited

U.S. PATENT DOCUMENTS

| 10,032,550 | B1* | 7/2018 | Zhang ............... H01F 7/064 |
| 2015/0109223 | A1 | 4/2015 | Kessler et al. |
| 2019/0286238 | A1* | 9/2019 | Yahata .............. G06F 3/044 |

* cited by examiner

*Primary Examiner* — Robert J Michaud
(74) *Attorney, Agent, or Firm* — JCIPRNET (57) ABSTRACT

A touchpad module includes a movable plate in which one surface is an operation surface of a touchpad, a support member including a facing portion facing the other surface of the movable plate, damper members for connecting the movable plate and the support member, and an actuator for vibrating the movable plate. The actuator includes an air-core coil and a magnet facing each other in a first direction in which the other surface faces the facing portion. The air-core coil is fixed to the other surface, and the magnet is fixed to the facing portion. The actuator vibrates the movable plate in a second direction perpendicular to the first direction by energizing the air-core coil.

6 Claims, 7 Drawing Sheets

TOUCHPAD MODULE

CROSS REFERENCE TO RELATED APPLICATION

This application claims the priority benefit of Japan Application No. 2018-200772, filed on Oct. 25, 2018. The entirety of the above-mentioned patent application is hereby incorporated by reference herein and made a part of this specification.

BACKGROUND OF THE DISCLOSURE

Technical Field

The disclosure relates to a touchpad module.

Related Art

Conventionally, an input device including a touchpad is mounted on various devices such as a notebook PC, a tablet computer, and a smartphone. The touchpad includes a sensor for detecting a position of an operator's finger tracing an operation surface.

In patent literature 1: U.S. Patent Application Laid-Open No. 2015/0109223, an example of an input device including a touchpad is disclosed. The input device of U.S. Patent Application Laid-Open No. 2015/0109223 includes a housing, a trackpad plate supported by an arm portion arranged in the housing, and a position sensor that detects a position of the operator's finger touching the trackpad plate.

In the input device of U.S. Patent Application Laid-Open No. 2015/0109223, the trackpad plate and the housing are connected to each other through a damper member, and an actuator that vibrates the trackpad plate is arranged. The actuator includes a suction plate fixed to an end portion of the trackpad plate, and a metal core and a coil fixed to the housing. When a magnetic field is generated by energizing the coil, the suction plate is sucked toward a metal core side. Thereby, the trackpad plate can be vibrated and feedback caused by tactility can be given to the operator's finger touching the trackpad plate.

An input device (or a touchpad module) including an actuator that vibrates a touchpad is desired to be downsized and thinned. However, in the input device of U.S. Patent Application Laid-Open No. 2015/0109223, the actuator that drives a trackpad plate has a structure in which a magnetic field is generated by arranging a plurality of metal cores wound with coils, and thus the actuator is disadvantageous for downsizing and thinning.

Additionally, in the input device of U.S. Patent Application Laid-Open No. 2015/0109223, a suction plate faces a distal end of the metal core in a vibration direction of the trackpad plate. Therefore, when energization starts, a distance between the suction plate and the metal core is the largest and suction force is the weakest. Accordingly, an initial operation cannot be quickly performed, and responsiveness of the initial operation is poor.

In view of the above problems, an objective of the disclosure is to achieve downsizing and thinning of a touchpad module including an actuator that vibrates a touchpad, and to increase responsiveness of an initial operation of the actuator.

SUMMARY

An exemplary touchpad module according to the disclosure includes a movable plate in which an operation surface of a touchpad is arranged on one surface; a support member having a facing portion facing the other surface of the movable plate; damper members for connecting the movable plate and the support member; and an actuator for vibrating the movable plate, wherein the actuator includes an air-core coil and a magnet facing each other in a first direction in which the other surface and the facing portion face each other, and wherein one of the air-core coil and the magnet is fixed to the other surface and the other is fixed to the facing portion.

DESCRIPTION OF THE EMBODIMENTS

According to the exemplary touchpad module of the disclosure, it is possible to achieve downsizing and thinning of the touchpad module while arranging an actuator that vibrates a touchpad and to increase responsiveness of an initial operation of the actuator.

Hereinafter, exemplary embodiments according to the disclosure are described with reference to the drawings. In the present specification, a direction perpendicular to an operation surface of a touchpad is defined as a "first direction Z", and two directions perpendicular to the first direction Z and perpendicular to each other are defined as a "second direction X" and a "third direction Y". The second direction X and the third direction Y are directions along the operation surface. In addition, one side in the first direction Z is set as a Z1 direction, the other side in the first direction Z is set as a Z2 direction, one side in the second direction X is set as an X1 direction, the other side in the second direction X is set as an X2 direction, one side in the third direction Y is set as a Y1 direction, and the other side in the third direction Y is set as a Y2 direction. The operation surface of the touchpad is directed in the Z1 direction.

Moreover, in a form in which a touchpad module is mounted on a notebook PC described later, a case is described as an example in which the first direction Z coincides with a vertical direction, the Z1 direction coincides with an upper direction, the second direction X coincides with a left-right direction for a user who uses the notebook PC, and the third direction Y coincides with a front-rear direction for the user who uses the notebook PC. However, the disclosure is not limited to the form arranged in such an orientation.

<Configuration of Notebook PC>

A touchpad module according to an embodiment of the disclosure is mounted on various devices such as a notebook PC, a tablet computer, a smartphone, and a portable game console. The devices are controlled based on an input operation to a touchpad described later. Hereinafter, the notebook PC is described as an example of the device on which the touchpad module according to the embodiment of the disclosure is mounted.

Figure 1:
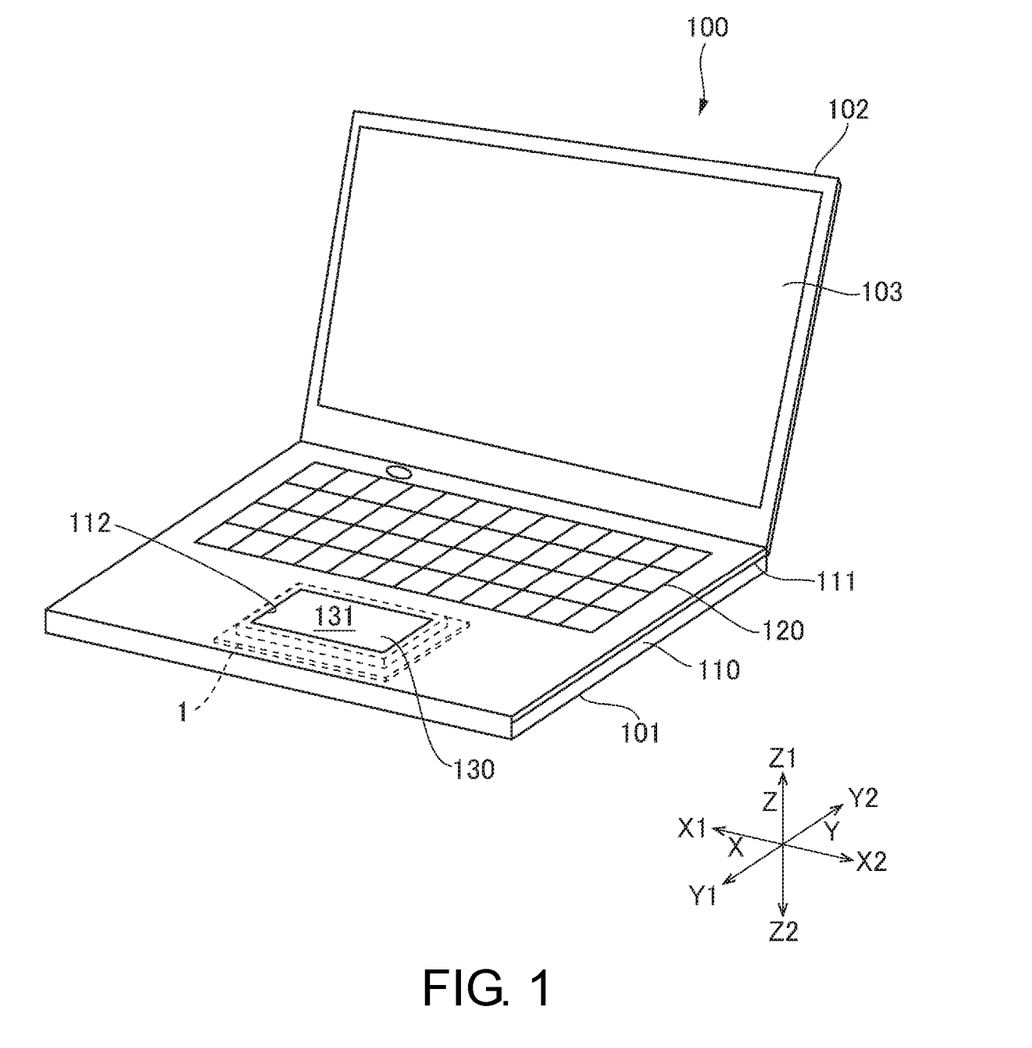
FIG. 1 is a perspective view of a notebook PC.

FIG. 1 is a perspective view of a notebook PC 100. The notebook PC 100 illustrated in FIG. 1 includes a computer body 101 which is a main body of the device, and a display unit 102. The display unit 102 includes a display screen 103 such as a liquid crystal display. The display unit 102 is rotatably connected to one end portion of the computer body 101. The display unit 102 can be moved to a closed position where the computer body 101 is covered from above (Z1 direction) and an open position where the display screen 103 can be viewed toward the front (Y1 direction).

The computer body 101 includes a housing 110, a keyboard 120 and a touchpad 130 exposed on a top surface (surface in Z1 direction) of the housing 110, and a control unit (not illustrated) that performs arithmetic processing and control of the display unit 102 and the like based on input operations to the keyboard 120 and the touchpad 130. The control unit includes, for example, electronic components such as a CPU and a memory mounted on a substrate disposed inside the housing 110.

The touchpad 130 is a structural component of the touchpad module 1 described later. The touchpad 130 includes an operation surface 131 on which input operation is performed by the touch of a user's finger. The touchpad module 1 is contained in the housing 110 except the operation surface 131. The keyboard 120 is disposed on a backside (Y2 direction side) of an upper plate portion 111 of the housing 110. The upper plate portion 111 includes a rectangular opening portion 112 that opens on a front side (Y1 direction side) of the keyboard 120. The touchpad module 1 is disposed at a position where the operation surface 131 and the opening portion 112 overlap each other in the first direction Z and fixed to the housing 110.

The touchpad 130 has a planar sensor expanding along the operation surface 131 and detects a planar position of the finger touching the operation surface 131. For example, a capacitance sensor is used as the sensor for position detection. In addition, the touchpad 130 has a pressure sensor and detects that the operation surface 131 is pressed by a finger. Signals from the sensor that performs position detection and the pressure sensor are input to a control unit of the notebook PC 100. In the notebook PC 100, a cursor can be moved on the display screen 103 according to the detection of the finger's position based on operation of tracing the operation surface 131 of the touchpad 130 with a finger. In addition, various operations can be performed according to click operations in which the operation surface 131 is pressed by a finger.

Configuration of Touchpad Module: First Embodiment

Figure 2:
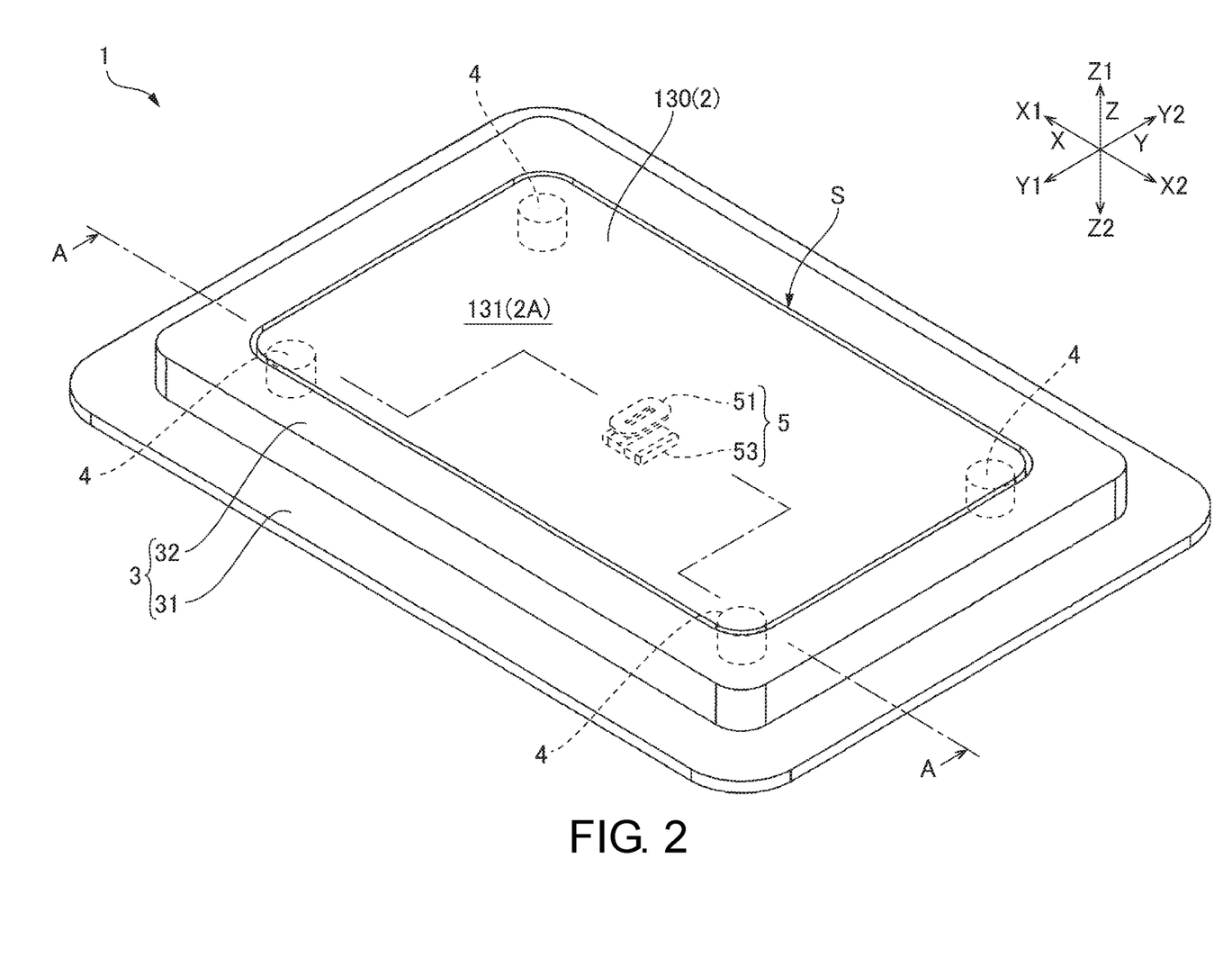
FIG. 2 is a perspective view of a touchpad module according to a first embodiment.
Figure 3:
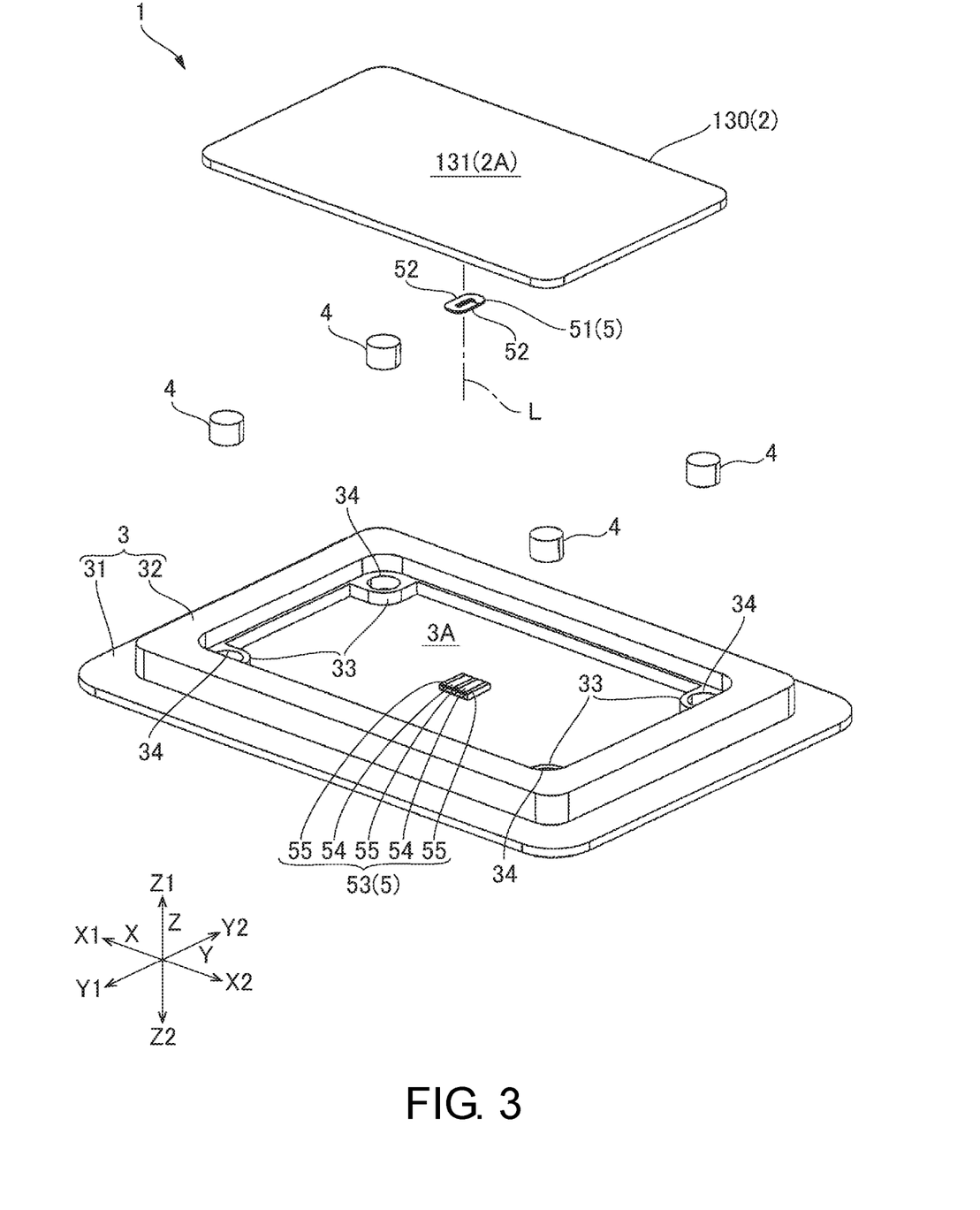
FIG. 3 is an exploded perspective view of the touchpad module according to the first embodiment.
Figure 4:
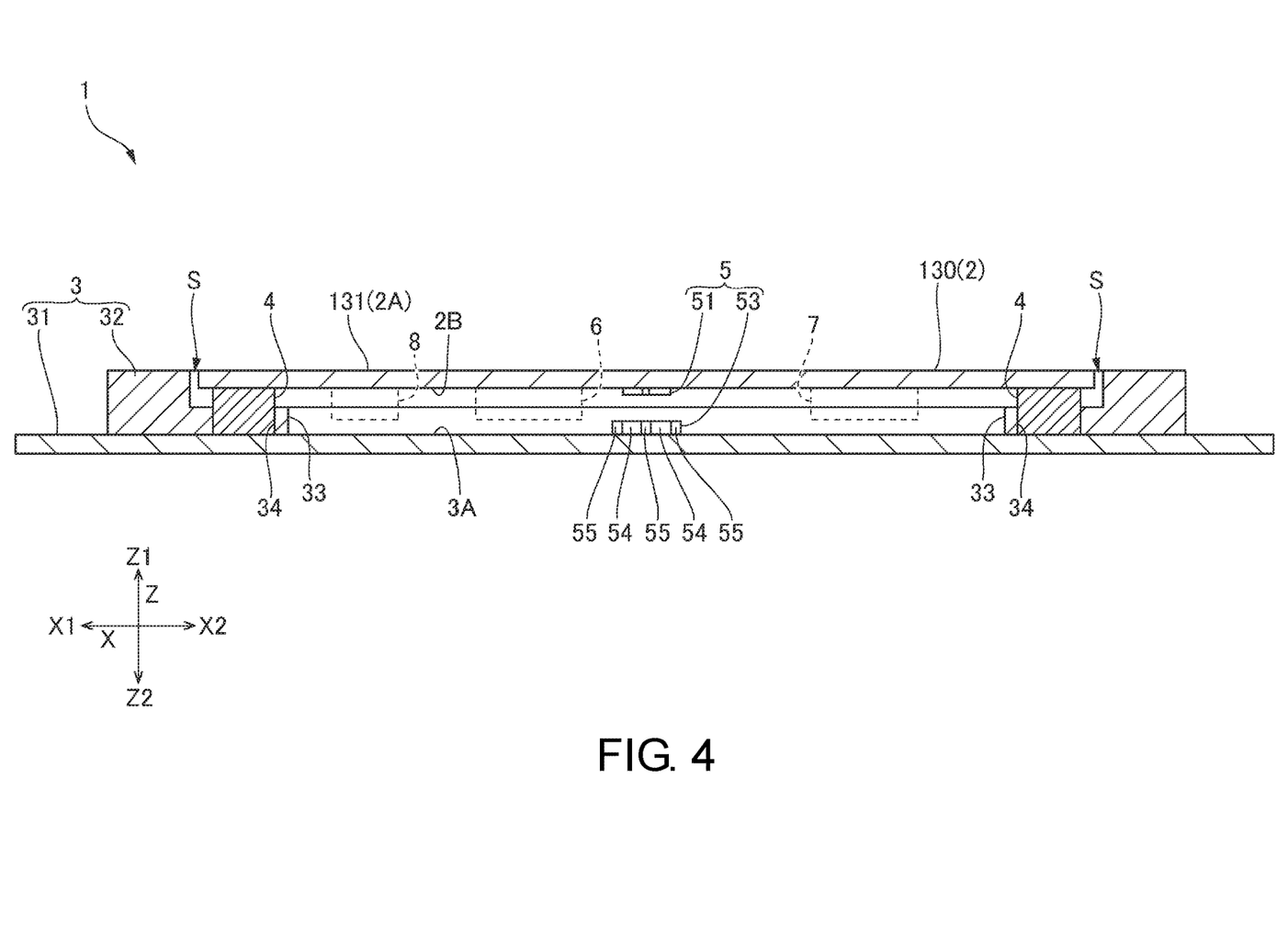
FIG. 4 is a cross-sectional view of the touchpad module according to the first embodiment.

FIG. 2 is a perspective view of the touchpad module 1 according to the first embodiment. FIG. 3 is an exploded perspective view of the touchpad module 1 according to the first embodiment. FIG. 4 is a cross-sectional view (cross-sectional view of a position A-A in FIG. 2) of the touchpad module 1 according to the first embodiment. As illustrated in FIGS. 2-4, the touchpad module 1 includes a movable plate 2 equipped with the touchpad 130, a support member 3, damper members 4 for connecting the movable plate 2 and the support member 3, and an actuator 5 for vibrating the movable plate 2. When the touchpad module 1 is mounted on the notebook PC 100, the support member 3 is fixed to the housing 110.

When input operation is performed on the operation surface 131 of the touchpad 130, the touchpad module 1 drives the actuator 5 and vibrates the movable plate 2 based on outputs from the sensor that performs position detection and the pressure sensor. Accordingly, the vibration is transmitted to the user's finger through the operation surface 131. Therefore, it is possible to give feedback caused by tactility to the user corresponding to the input operation performed by the user. For example, a click feeling such as physically pressing a button can be provided to the user. Besides, in addition to the click feeling, tactility such as smooth feeling and rough feeling on a surface of an object can be provided to the user by vibration of the movable plate 2.

When the touchpad module is fixed to the housing 110 of the notebook PC 100, it is preferable that the damper member such as rubber is interposed between the support member 3 and the housing 110. In this manner, the vibration of the movable plate 2 caused by the actuator 5 can be inhibited from being transmitted to the housing 110 through the support member 3.

The movable plate 2 includes the touchpad 130. In the first embodiment, the movable plate 2 includes a rectangular touchpad 130, and the operation surface 131 of the touchpad 130 is arranged on one surface 2A of the movable plate 2. The damper member 4 is fixed to the other surface 2B of the movable plate 2 (see FIG. 4). The other surface 2B faces the support member 3 in the first direction Z, and the damper member 4 is interposed between the other surface 2B and the support member 3. In addition, as described later, a part of the actuator 5 is fixed to the center of the other surface 2B.

The movable plate 2 may be configured with a plurality of components including the touchpad 130. For example, it is possible to use an assembly, as the movable plate 2, in which the touchpad 130 is fixed to a surface in the Z1 direction of a substrate which is a member different from the touchpad 130. In this case, the other surface 2B of the movable plate 2 is a surface of the substrate in the Z2 direction. Accordingly, a part of the actuator 5 and the damper member 4 are fixed to the substrate.

The support member 3 includes a flat plate-shaped portion 31 and a rectangular frame portion 32. The frame portion 32 protrudes from the plate-shaped portion 31 to a side on which the movable plate 2 is located (Z1 direction). In the first embodiment, the frame portion 32 is a member different from the plate-shaped portion 31 and is fixed to the plate-shaped portion 31. Moreover, the support member 3 may be a single member including the plate-shaped portion 31 and the frame portion 32. An external shape of the plate-shaped portion 31 viewed in the first direction Z is greater than an external shape of the frame portion 32, and an outer peripheral portion of the plate-shaped portion 31 protrudes toward an outer peripheral side of the frame portion 32. As illustrated in FIGS. 2 and 4, the movable plate 2 and the damper member 4 are disposed on an inner peripheral side of the frame portion 32. A space S is arranged between the movable plate 2 and an inner peripheral surface of the frame portion 32.

As illustrated in FIG. 3, the support member 3 includes protrusion portions 33 that protrude from the four corners of the frame portion 32 toward the inner peripheral side. Each of the protrusion portions 33 includes a circular positioning hole 34 that opens in the Z1 direction. The damper member 4 has a cylindrical shape, and an end portion in the Z2 direction is disposed in the positioning hole 34. The height of the protrusion portion 33 in the first direction Z is less than the height of the frame portion 32 in the first direction Z. Therefore, an end portion of the damper member 4 in the Z1 direction protrudes from the positioning hole 34 in the Z1 direction (see FIG. 4). In the first embodiment, the damper member 4 is configured with an elastic member such as rubber and fixed to the movable plate 2 and the support member 3 by an adhesive or the like.

As described later, when the movable plate 2 is vibrated in a direction (second direction X) along the operation surface 131 by the actuator 5, the damper member 4 is elastically deformed in a direction in which the movable plate 2 moves, and biases the movable plate 2 in a direction opposite to a moving direction. In the first embodiment, the damper members 4 support the four corners of the movable plate 2 and are disposed at positions symmetrical with respect to the center of the movable plate 2 in the second direction X and the third direction Y. Accordingly, the movable plate 2 is supported with a good balance by the damper members 4.

As illustrated in FIGS. 3 and 4, the support member 3 includes a facing portion 3A that faces the other surface 2B of the movable plate 2 in the first direction Z. The facing portion 3A is a central portion of the plate-shaped portion 31 and arranged on an inner peripheral side of the frame portion 32. As illustrated in FIG. 4, a space between the other surface 2B and the facing portion 3A is used as a space in which the actuator 5 is arranged. As described below, a part of the actuator 5 is fixed to the center of the facing portion 3A.

<Actuator>

The actuator 5 includes an air-core coil 51 and a magnet 53. The air-core coil 51 is fixed to one of the movable plate 2 and the support member 3, and the magnet 53 is fixed to the other of the movable plate 2 and the support member 3. As illustrated in FIG. 4, the touchpad module 1 is assembled in a state that the other surface 2B of the movable plate 2 and the facing portion 3A of the support member 3 face each other with a predetermined interval in the first direction Z, and the one surface 2A of the movable plate 2 and an end surface of the frame portion 32 in the Z1 direction are located substantially on the same surface. In the actuator 5, the air-core coil 51 and the magnet 53 are disposed at positions facing each other in the first direction Z with a predetermined gap and the air-core coil 51 is disposed in a magnetic field of the magnet 53.

The air-core coil 51 and the magnet 53 function as a magnetic drive mechanism. If the air-core coil 51 is energized, the air-core coil 51 and the magnet 53 are relatively moved in a direction perpendicular to the first direction Z by Lorentz force. In the first embodiment, in the actuator 5, when the air-core coil 51 is energized, the air-core coil 51 and the magnet 53 are relatively moved in the second direction X. Accordingly, the actuator 5 vibrates the movable plate 2 in the second direction X.

In the first embodiment, the air-core coil 51 is fixed to the other surface 2B of the movable plate 2 and the magnet 53 is fixed to the facing portion 3A of the support member 3. As illustrated in FIGS. 2 and 4, the air-core coil 51 is disposed in the center of the movable plate 2 and protrudes from the other surface 2B of the movable plate 2 toward the Z2 direction. The air-core coil 51 is energized through a power supply wire, a substrate or the like (not illustrated). In addition, the magnet 53 is disposed in the center of the frame portion 32 and protrudes from the facing portion 3A toward the Z1 direction. The fixing of the air-core coil 51 and the magnet 53 is performed by an adhesive, an adhesive tape, or the like.

As illustrated in FIG. 3, the air-core coil 51 is a flat coil that is flat in a coil axis line direction L. The air-core coil 51 is fixed to the other surface 2B of the movable plate 2 in a direction in which the coil axis line direction L substantially coincides with the first direction Z. The air-core coil 51 has an oval shape and includes two effective sides 52 extending in a direction perpendicular to the coil axis line direction L. In the first embodiment, the two effective sides 52 extend in parallel in the third direction Y and are arranged side by side in the second direction X.

The magnet 53 has a plurality of magnetic poles on a surface facing the air-core coil 51. In the magnet 53, on the surface facing the air-core coil 51, magnetic poles (S pole and N pole) having different polarities are arranged side by side in the second direction X. In a state that the air-core coil 51 is not energized, the movable plate 2 is located at a neutral stable position in the center of the frame portion 32. In a state that the movable plate 2 is located at the neutral stable position, one of the two effective sides 52 of the air-core coil 51 faces the S pole of the magnet 53 and the other faces the N pole of the magnet 53. When the air-core coil 51 is energized, currents in opposite directions flow through the two effective sides 52 arranged side by side in the second direction X. Accordingly, the actuator 5 can vibrate the movable plate 2 in the second direction X by switching directions of the current flowing through the air-core coil 51.

As illustrated in FIGS. 3 and 4, the magnet 53 according to the first embodiment is a magnet array in which a plurality of first magnets 54 and a plurality of second magnets 55 are alternately arranged in the second direction X. A magnet pole direction of the first magnets 54 is the first direction Z, and a magnet pole direction of the second magnets 55 is the second direction X. The first magnet 54 and the second magnet 55 are arranged in a Halbach array in which the magnetic pole directions of adjacent magnets rotate by 90 degrees. Accordingly, a magnetic flux generated from the magnet 53 is concentrated on an air-core coil 51 side, and a magnetic field strength on the air-core coil 51 side is greater than a magnetic field strength on a side opposite to the air-core coil 51.

As illustrated by a dashed line in FIG. 4, when a pendulum 6 is mounted on the movable plate 2 in order to adjust a weight of the movable plate 2, a space between the other surface 2B and the facing portion 3A can be used as an arrangement space of the pendulum 6. It is desirable that a vibration frequency of the actuator 5 coincides with a resonance frequency of a vibration system in which the movable plate 2 and components fixed to the movable plate 2 are supported by the damper member 4 so as to be able to vibrate. The resonance frequency of the vibration system in the touchpad module 1 can be adjusted by adjusting the weight of the movable plate 2. By making the resonance frequency coincide with the resonance frequency of the actuator 5, vibration output of the touchpad module 1 can be increased.

In addition, as illustrated by the dashed line in FIG. 4, an electronic component 7 that processes a signal output from the sensor of the touchpad 130, an electronic component 8 that controls the actuator 5 based on the signal of the sensor of the touchpad 130, and the like may be arranged between the other surface 2B of the movable plate 2 and the facing portion 3A. When the electronic components 7 and 8 are fixed to the other surface 2B of the movable plate 2, a wire connected to the touchpad 130 and a wire connected to the actuator 5 can be collectively drawn around on a movable plate 2 side. Moreover, the electronic components 7 and 8 can be mounted on a substrate (not illustrated) disposed on an outer peripheral side of the frame portion 32 without being arranged between the other surface 2B of the movable plate 2 and the facing portion 3A.

Main Operation and Effect of First Embodiment

As described above, the touchpad module 1 according to the first embodiment includes the movable plate 2 in which the operation surface 131 of the touchpad 130 is arranged on one surface 2A, the support member 3 including the facing portion 3A facing the other surface 2B of the movable plate 2, the damper members 4 for connecting the movable plate 2 and the support member 3, and the actuator 5 for vibrating the movable plate 2. The actuator 5 includes the air-core coil 51 and the magnet 53 facing each other in the first direction Z in which the other surface 2B faces the facing portion 3A. One of the air-core coil 51 and the magnet 53 is fixed to the other surface 2B, and the other is fixed to the facing portion 3A.

In the first embodiment, the number of components of the actuator 5 arranged between the movable plate 2 and the support member 3 is small, the air-core coil 51 is directly fixed to the other surface 2B of the movable plate 2, and the magnet 53 is directly fixed to the facing portion 3A of the support member 3. In this way, the air-core coil 51 and the magnet 53 functioning as a magnetic drive mechanism are in a state of being separated without being contained in a case, and the air-core coil 51 and the magnet 53 in the separated state are fixed to the movable plate 2 and the support member 3 without using a case or the like, thereby reducing an arrangement space of the actuator 5. Accordingly, downsizing and thinning of the touchpad module 1 can be achieved. In addition, the number of components can be reduced and weight reduction and cost reduction can be achieved.

The actuator 5 according to the first embodiment is configured using the air-core coil 51. Accordingly, since no core is required, downsizing and thinning can be achieved. In addition, since no core is required, a degree of freedom of the arrangement of the air-core coil 51 increases and easiness of assembly also increases. Furthermore, the number of components can be reduced and weight reduction and cost reduction can be achieved.

In the first embodiment, the air-core coil 51 is a flat coil that is flat in the coil axis line direction L, and the air-core coil 51 is disposed in a direction in which the coil axis line direction L substantially coincides with the first direction Z. In addition, the magnet 53 faces the air-core coil 51 in the coil axis line direction L. Accordingly, the actuator 5 can be thinned in the first direction Z, and the touchpad module 1 can be thinned in the first direction Z.

In the first embodiment, the actuator 5 vibrates the movable plate 2 in the second direction X perpendicular to the first direction Z in which the magnet 53 faces the air-core coil 51. Accordingly, in the state that the movable plate 2 is located at the neutral stable position, it is possible to directly oppose the effective sides 52 of the air-core coil 51 and the magnetic pole arranged in the magnet 53. Accordingly, since a distance between the effective sides 52 and the magnetic pole is disposed to be the closest, the initial operation can be quickly performed when the initial operation starts. Therefore, responsiveness of the initial operation is excellent and tactility can be quickly transmitted to the user.

In the touchpad module 1 in which feedback caused by tactility is performed, driving of the actuator 5 is performed by energizing for as few as one pulse or as many as several pulses at most, and thereby a reciprocating operation of the movable plate 2 is performed during only one reciprocation or several reciprocations at most. Therefore, it is desirable to transmit the tactility with a crisp sense by a rapid rise of the initial operation and a quick fall at the end of the operation. Since the touchpad module 1 according to the first embodiment is excellent in responsiveness of the initial operation, the tactility can be quickly transmitted.

In the first embodiment, the air-core coil 51 has an oval shape in which two effective sides 52 are included, and the number of the air-core coils 51 is one. In addition, the magnet 53 includes a plurality of magnetic poles whose surfaces facing the two effective sides 52 are arranged side by side in the second direction X that is an arrangement direction of the two effective sides 52. That is, on a surface of the magnet 53 in the Z1 direction, magnetic poles (S pole and N pole) having different polarities are arranged side by side in the second direction. Accordingly, the movable plate 2 can be vibrated by switching the direction of the current flowing through the air-core coil 51. As described above, if the actuator 5 includes at least one air-core coil 51, the movable plate 2 can be vibrated. Accordingly, the number of components of the actuator can be reduced. Therefore, downsizing of the actuator 5 and the touchpad module 1 can be achieved. In addition, since the number of coils is small, power consumption can be reduced. Accordingly, it is suitable for mounting on a battery-driven device.

In the first embodiment, the magnet 53 is a magnet array in which a plurality of the first magnets 54 and a plurality of the second magnets 55 are arranged in the second direction X, and the first magnet 54 and the second magnet 55 are arranged in the Halbach array. Accordingly, by concentrating the magnetic flux generated from the magnet 53 on the air-core coil 51 side, the strength of the magnetic field on the air-core coil 51 side can be increased. Thereby, the size of the magnet 53 for obtaining a magnetic field having a required strength can be reduced, and thus the magnet 53 can be downsized. Therefore, downsizing and weight saving of the actuator 5 and the touchpad module 1 can be achieved. In addition, component cost can be reduced by downsizing the magnet 53.

In the first embodiment, the air-core coil 51 is fixed to the movable plate 2 including the touchpad 130, and the magnet 53 is fixed to the support member 3. Accordingly, wiring for the actuator 5 and wiring for the touchpad 130 can be concentrated on a movable plate 2 side, and thus the wiring can be simplified. In addition, operation of drawing the wire around is easily performed.

In the support member 3 according to the first embodiment, the movable plate 2 and the support member 3 are connected by interposing the damper member 4 between the other surface 2B of the movable plate 2 and the support member 3, and thus it is easy to assemble the movable plate 2, the support members 3, and the damper members 4. In addition, the support member 3 includes the plate-shaped portion 31 including the facing portion 3A facing the movable plate 2 and the frame portion 32 protruding from the plate-shaped portion 31 surrounding the facing portion 3A, and the frame portion 32 includes the positioning hole 34 for disposing the damper member 4. Accordingly, it is easy to perform positioning of the damper members 4 and to assemble the touchpad module 1.

Configuration of Touchpad Module: Second Embodiment

Figure 5:
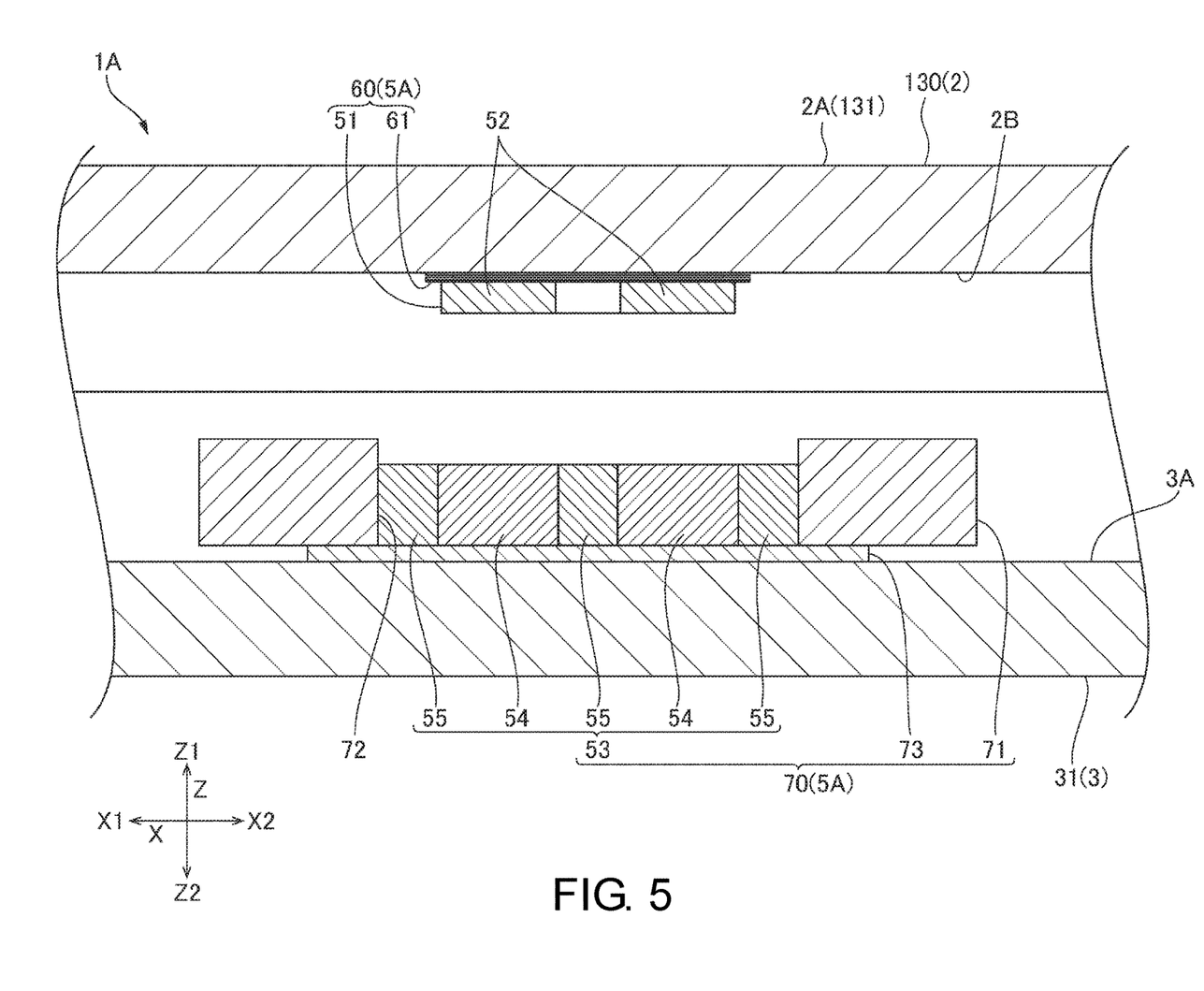
FIG. 5 is a partial cross-sectional view of a touchpad module according to a second embodiment.
Figure 6:
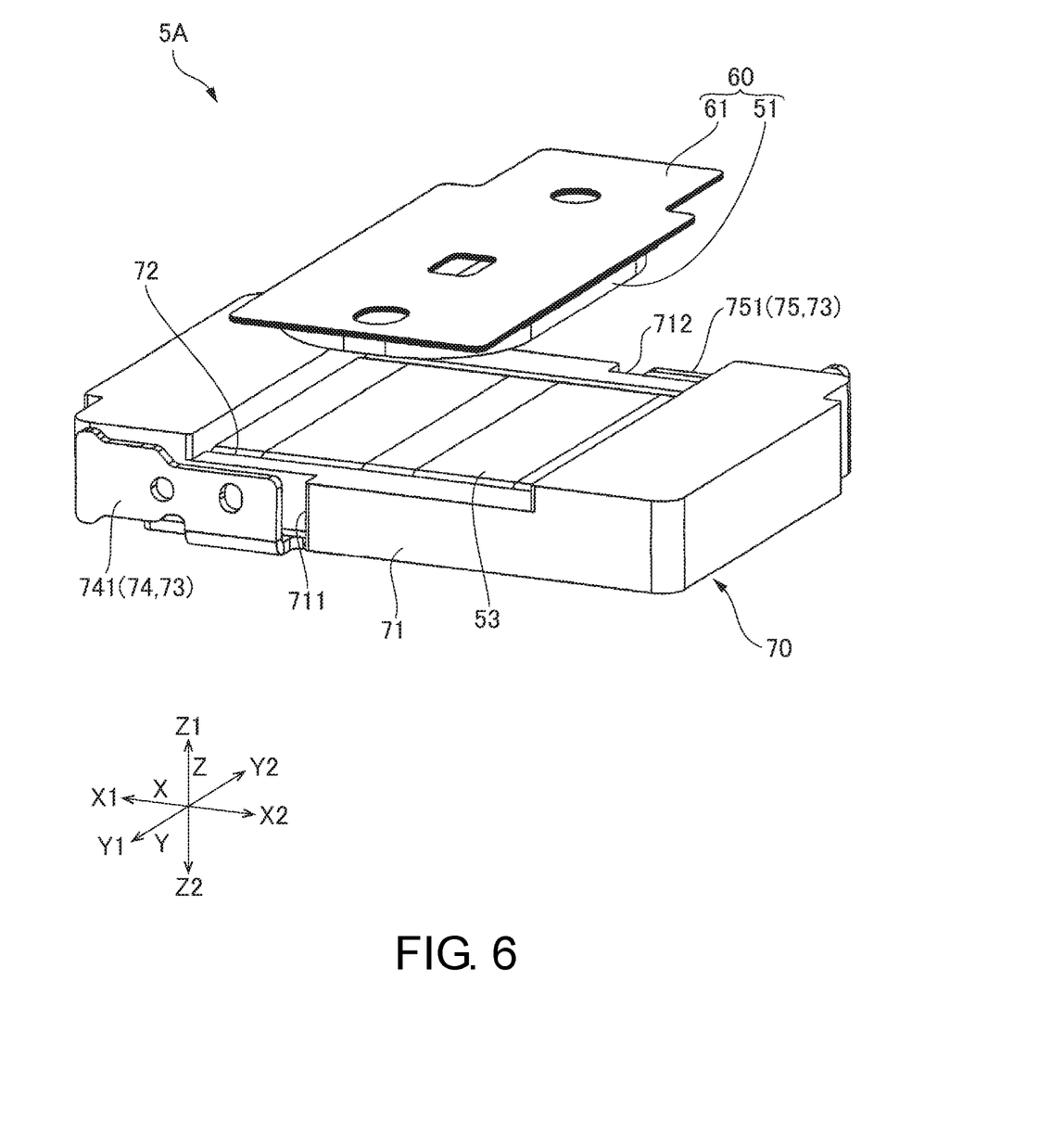
FIG. 6 is a perspective view of an actuator according to the second embodiment.
Figure 7:
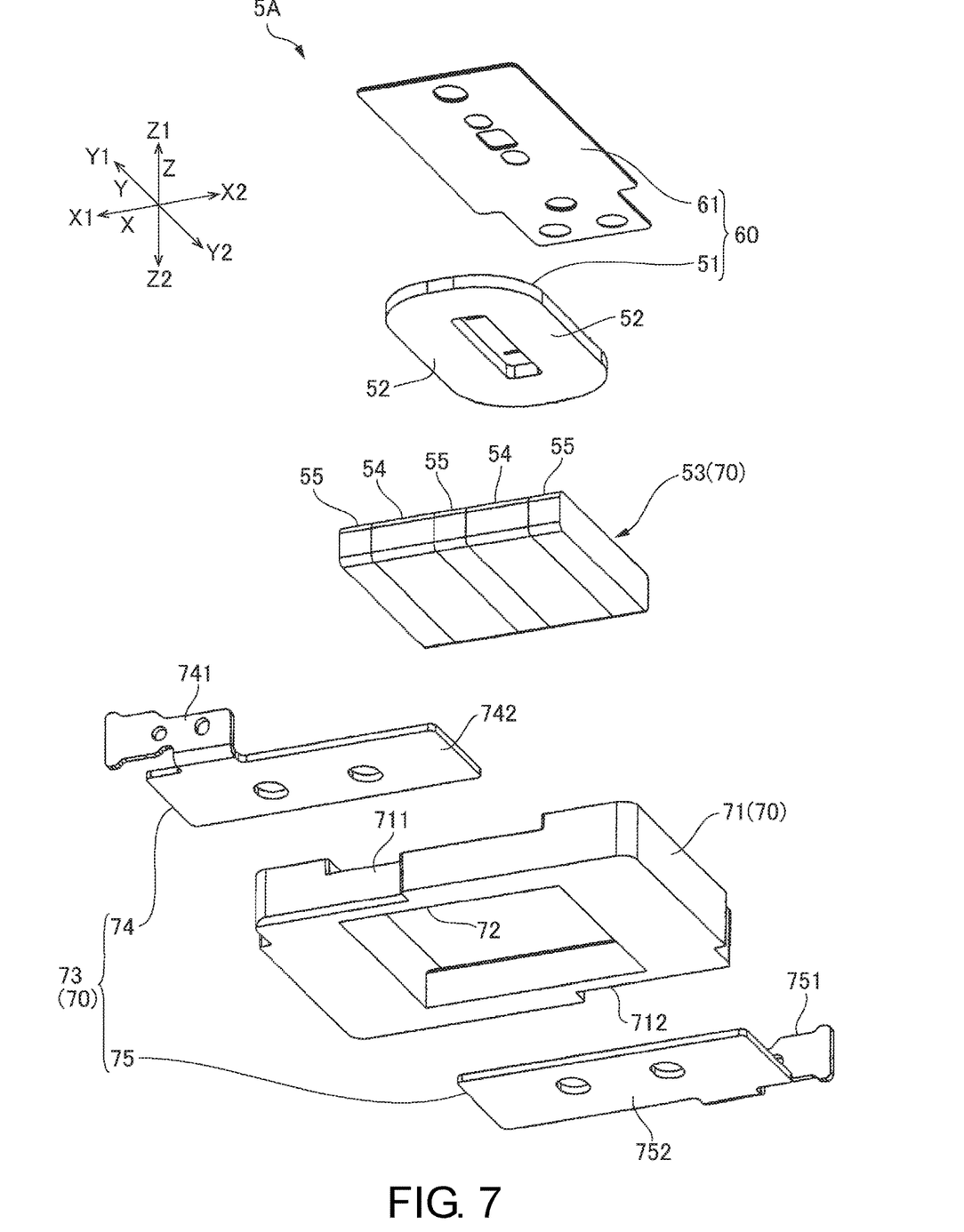
FIG. 7 is an exploded perspective view of the actuator according to the second embodiment.

FIG. 5 is a partial cross-sectional view of a touchpad module 1A according to a second embodiment, and a partial cross-sectional view in which the touchpad module 1A is cut at a position of the actuator 5A. FIG. 6 is a perspective view of the actuator 5A according to the second embodiment. FIG. 7 is an exploded perspective view of the actuator 5A according to the second embodiment. Hereinafter, the same configuration as in the first embodiment is denoted by the same reference numeral and description thereof is omitted, and a configuration different from the configuration of the first embodiment is described with a different reference numeral.

The touchpad module 1A according to the second embodiment includes the movable plate 2, the support member 3, the damper members 4, and an actuator 5A. The movable plate 2, the support member 3, and the damper members 4 have the same configurations as the configurations in the first embodiment. The movable plate 2 includes the touchpad 130, and one surface 2A of the movable plate 2 is the operation surface 131 of the touchpad 130. The actuator 5A includes a coil unit 60 fixed to the other surface 2B of the movable plate 2 and a magnet unit 70 fixed to the facing portion 3A of the support member 3. As illustrated in FIG. 5, the coil unit 60 and the magnet unit 70 face each other in the first direction Z.

The coil unit 60 includes the air-core coil 51 and a substrate 61. In this embodiment, the substrate 61 is a flexible printed substrate, and a wiring pattern for supplying power to the air-core coil 51 is arranged. The air-core coil 51 is fixed to a surface of the substrate 61 in the Z2 direction and is fixed to the other surface 2B through the substrate 61.

The magnet unit 70 includes the magnet 53, a frame 71 that holds the magnet 53, and a yoke 73. The frame 71 has a rectangular parallelepiped shape taking the second direction X as a longitudinal direction. The frame 71 is made of metal. The magnet 53 is disposed in a magnet disposition hole 72 arranged in the center of the frame 71. Since the magnet disposition hole 72 is a through-hole that penetrates the frame 71 in the first direction Z, the magnetic pole arranged on the surface of the magnet 53 is exposed on the surface of the magnet unit 70 in the Z1 direction and faces the air-core coil 51. The air-core coil 51 is a flat coil, and the magnet 53 is a magnet array in which a plurality of first magnets 54 and a plurality of second magnets 55 are arranged in the Halbach array.

The yoke 73 includes a first yoke member 74 and a second yoke member 75 which are made of metal. The first yoke member 74 includes a first plate portion 741 disposed in a first concave portion 711 arranged on a side surface of the frame 71 in the Y1 direction, and a second plate portion 742 on a surface of the frame 71 in the Z2 direction. The first plate portion 741 and the second plate portion 742 are connected to each other at a substantially right angle. The second yoke member 75 has the same shape as the first yoke member 74. The second yoke member 75 includes a first plate portion 751 disposed in a second concave portion 712 arranged on a side surface of the frame 71 in the Y2 direction, and a second plate portion 752 along the surface of the frame 71 in the Z2 direction.

The yoke 73 is attached in a state that the second plate portion 742 of the first yoke member 74 blocks a region on a Y1 direction side from the center of the magnet disposition hole 72 in the third direction Y and the second plate portion 752 of the second yoke member 75 blocks a region on a Y2 direction side from the center of the magnet disposition hole 72 in the third direction Y. The second plate portion 742 and the second plate portion 752 are in contact with a surface on a Z2 direction side of the magnet 53 disposed in the magnet disposition hole 72. In addition, the second plate portion 742 and the second plate portion 752 are in contact with the facing portion 3A of the support member 3. The magnet 53 is fixed to the facing portion 3A through the yoke 73.

Main Operation and Effect of Second Embodiment

As described above, similar to the first embodiment, the touchpad module 1A according to the second embodiment includes the actuator 5A that vibrates the movable plate 2. The actuator 5A includes the air-core coil 51 and the magnet 53, which face each other in the first direction Z in which the other surface 2B of the movable plate 2 faces the facing portion 3A, one of the air-core coil 51 and the magnet 53 is fixed to the other surface 2B of the movable plate 2, and the other is fixed to the facing portion 3A of the support member 3.

In the actuator 5A according to the second embodiment, the air-core coil 51 is fixed to the other surface 2B through the substrate 61 connected to the air-core coil 51, and the magnet 53 is fixed to the facing portion 3A through the yoke 73 in contact with the magnet 53. In this way, the coil unit 60 and the magnet unit 70 are in a state of being separated from each other without being contained in a case, and the coil unit 60 and the magnet unit 70 in the separated state are directly fixed to the movable plate 2 and the support member 3, thereby achieving downsizing and thinning of the actuator 5A. Accordingly, similar to the first embodiment, downsizing and thinning of the touchpad module 1A can be achieved.

Similar to the first embodiment, the actuator 5A according to the second embodiment includes the air-core coil 51. Accordingly, since no core is required, downsizing and thinning can be achieved. In addition, since the air-core coil 51 is fixed to the substrate 61 and the air-core coil 51 is fixed to the movable plate 2 through the substrate 61, a wire connection work to the air-core coil is easily performed, and easiness of assembly is high.

In the actuator 5A of the second embodiment, the magnet 53 including the plurality of first magnets 54 and the plurality of second magnets 55 arranged in the Halbach array is held in the magnet disposition hole 72 of the frame 71. Therefore, an assembly work of the magnet 53 is easy. The yoke 73 is disposed on a side opposite to a side where the air-core coil 51 is located with respect to the magnet disposition hole 72, and the magnet 53 is fixed to the facing portion 3A of the support member 3 through the yoke 73. Therefore, a magnetic path can be formed on the opposite side of the air-core coil 51 by the yoke 73. Accordingly, leakage magnetic flux can be reduced, and thus the size of the magnet 53 for obtaining magnetic field having a required strength can be reduced. Accordingly, the magnet 53 can be downsized.

In the second embodiment, the coil unit 60 including the air-core coil 51 is fixed to the movable plate 2 including the touchpad 130, and the magnet unit 70 is fixed to the support member 3. Accordingly, similar to the first embodiment, the wiring for the actuator 5A and the wiring for the touchpad 130 can be concentrated on the movable plate 2 side, and thus the wiring can be simplified. In addition, the operation for drawing the wiring around is easily performed.

Modification Example (1) In each embodiment described above, the air-core coil 51 and the magnet 53 can be reversely disposed. That is, the air-core coil 51 is fixed to the facing portion 3A of the support member 3, and the magnet 53 is fixed to the other surface 2B of the movable plate 2. In this case, since the magnet unit 70 according to the second embodiment is mounted on the movable plate 2, the frame 71 can be made function as a pendulum. Accordingly, by adjusting the weight of the frame 71, it is possible to make the resonance frequency of a vibration system in which the movable plate 2 and components fixed to the movable plate 2 are supported by the damper members 4 so as to be able to vibrate coincide with the vibration frequency of the movable plate 2.

(2) In each embodiment described above, the vibration direction of the movable plate 2 is the second direction X; however, it is possible to set the vibration direction of the movable plate 2 to the third direction Y by rotating the actuators 5 and 5A for 90 degrees to dispose the actuators 5 and 5A. In addition, by mounting both an actuator that generates vibration in the second direction X and an actuator that generates vibration in the third direction Y on the touchpad module, the movable plate 2 can be vibrated in two directions.

(3) In each embodiment, the magnet 53 is a magnet array in which the first magnets 54 and the second magnets 55 are alternately arranged and fixed; however, the magnet 53 may be a single magnet, and may be magnetized so that the surface facing the air-core coil 51 has an N pole and an S pole.

What is claimed is:

1. A touchpad module comprising:
    a movable plate in which an operation surface of a touchpad is arranged on one surface;
    a support member comprising a facing portion facing the other surface of the movable plate;
    damper members for connecting the movable plate and the support member; and
    an actuator for vibrating the movable plate,
    wherein the actuator comprises an air-core coil and a magnet facing each other in a first direction in which the other surface faces the facing portion,
    wherein one of the air-core coil and the magnet is fixed to the other surface and the other is fixed to the facing portion,
    wherein the actuator includes a yoke and a frame, the yoke is in contact with the magnet and the magnet is fixed to the frame and the yoke, and
    wherein the magnet is fixed to the other surface of the movable plate via the frame and the yoke or fixed to the facing portion of the support member via the frame and the yoke.

2. The touchpad module according to claim 1, wherein the air-core coil is a flat coil being flat in a coil axis line direction substantially coinciding with the first direction.

3. The touchpad module according to claim 2, wherein the air-core coil has an oval shape comprising two effective sides extending in a direction perpendicular to the coil axis line direction, and
    wherein the magnet includes a plurality of magnetic poles whose surfaces facing the effective sides are arranged side by side in an arrangement direction of the two effective sides.

4. The touchpad module according to claim 1, wherein the actuator comprises a substrate connected to the air-core coil, and
    wherein the air-core coil is fixed to the other surface of the movable plate or the facing portion through the substrate.

5. The touchpad module according to claim 1, wherein the magnet is a magnet array in which a plurality of magnets are disposed in a Halbach array.

6. The touchpad module according to claim 1, wherein the air-core coil is fixed to the movable plate, and
    wherein the magnet is fixed to the support member.

* * * * *